No. 769,666.

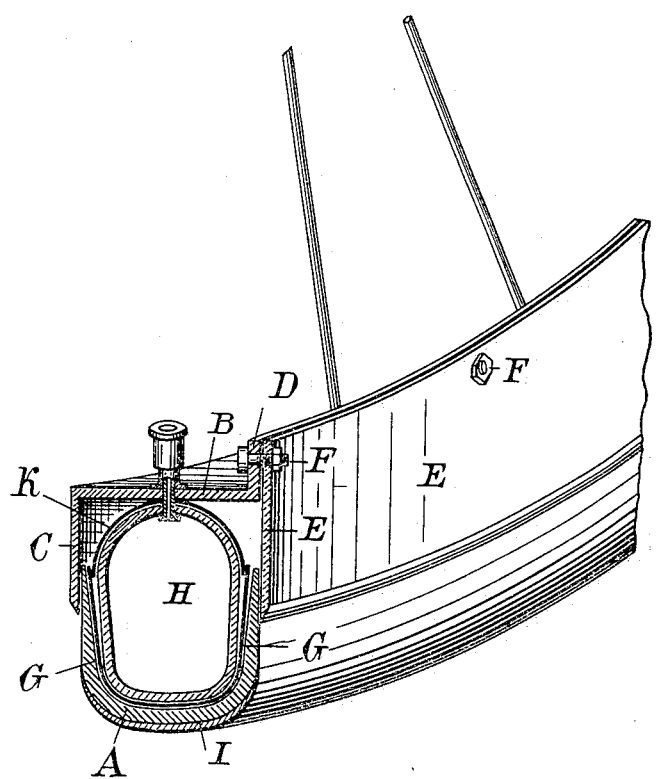

Patented September 6, 1904.

UNITED STATES PATENT OFFICE.

ALFRED PAPLEUX, OF LYONS, FRANCE.

TIRE.

SPECIFICATION forming part of Letters Patent No. 769,666, dated September 6, 1904.

Application filed May 8, 1903. Renewed August 8, 1904. Serial No. 219,811. (No model.)

*To all whom it may concern:*

Be it known that I, ALFRED PAPLEUX, a citizen of the French Republic, residing at Lyons, France, have invented certain new and useful Improvements in Tires, of which the following is a specification.

This invention relates to an unpuncturable elastic wheel-tire.

In the annexed drawing the improved tire is shown, as an example, in connection with a cycle-wheel.

The actual tire A is U-shaped in section and can be of metal, compressed paper, or any other rigid material of sufficient strength. The rim B, of wood or any suitable metal, has two vertical walls which extend in opposite directions. One of these walls, C, serves as a lateral guide for the tire A, and the other wall, D, serves as support on which the annular plate E, which forms the lateral guide for the other face of the tire, is fixed. This plate E is fixed by means of bolts and nuts F or rivets, screws, or any other suitable means. In place of the construction above described the rim B may be provided with two flanges, such as D, to receive two detachable plates, one at each side thereof. Inside the rim and the tire are attached bands of gummed cloth G or ordinary cloth, or a layer of gum can be used.
Inside the annular cavity thus formed an ordinary air-tube H or equivalent resilient means is placed. To prevent nipping of the air-tube, the rim contains a thin metal band K, which serves to support said tube H and to prevent the latter from bearing directly against the walls C D or plate E.

To reduce the noise produced by the running of the wheel, the rigid tire proper, A, can, if desired, be covered with a rubber band I to come into direct contact with the ground.

When the tire bears on the ground, its vertical walls slide on the face C of the rim and on the plate E, and at the same time the elastic part H yields. Very easy running is thus obtained, and owing to the hardness of the band A the latter is unpuncturable and practically unwearable.

I claim—

In a tire the combination of a wheel-rim comprising a base B and two parallel guiding-walls C E, a rigid annular U-shaped tire having its limbs guided between said walls C E, a resilient cushion H within the chamber formed by said rim and tire and a guard-plate K for preventing the nipping of said cushion between the sliding surfaces of parts A C E.

In witness whereof I have signed this specification in the presence of two witnesses.

ALFRED PAPLEUX.

Witnesses:
 JEAN GERMAIN,
 GUILLAUME PIOCHE.